United States Patent [19]

Espenan

[11] Patent Number: 5,069,353
[45] Date of Patent: Dec. 3, 1991

[54] HOUSING FOR FIBER-BUNDLE FILTER MODULES

[75] Inventor: Jean-Michel Espenan, Toulouse, France

[73] Assignee: Lyonnaise Des Eaux, Paris, France

[21] Appl. No.: 436,320

[22] Filed: Nov. 14, 1989

[30] Foreign Application Priority Data

Nov. 21, 1988 [FR] France ................. 88 15099

[51] Int. Cl.⁵ .............................. B65D 85/00
[52] U.S. Cl. ..................... 220/4.01; 156/294
[58] Field of Search ............... 220/3, 317, 352, 353, 220/610, 615, 307, 353, 356, 615, 401; 156/294, 423, 578, 294

[56] References Cited

U.S. PATENT DOCUMENTS

| | | | |
|---|---|---|---|
| 1,092,464 | 4/1914 | Watson et al. ............... | 220/615 X |
| 2,349,840 | 5/1944 | Babbitt ....................... | 220/615 X |
| 2,688,995 | 9/1954 | Wagoner ..................... | 220/307 X |
| 2,767,754 | 10/1956 | Lederer et al. ............. | 220/307 |
| 3,654,675 | 4/1972 | Peterson ..................... | 220/307 X |
| 3,791,517 | 2/1974 | Watanabe .................... | 220/307 X |
| 4,046,282 | 9/1977 | Ruch ........................... | 220/307 X |
| 4,446,986 | 5/1984 | Bowen et al. ............... | 220/307 |
| 4,662,402 | 5/1987 | Dreyfuss et al. ............ | 220/307 X |
| 4,944,977 | 7/1990 | Shantz et al. ............... | 156/294 X |

Primary Examiner—Steven M. Pollard
Attorney, Agent, or Firm—Amster, Rothstein & Ebenstein

[57] ABSTRACT

A housing made of plastic material for hollow fiber filter modules, includes both an abutment ring close to that end thereof which will be the bottom end after the module has been mounted vertically, and a centering ring at a short distance from the opposite end.

7 Claims, 1 Drawing Sheet

HOUSING FOR FIBER-BUNDLE FILTER MODULES

The invention relates to a housing for filter modules comprising bundles of hollow fibers or tubular membranes.

BACKGROUND OF THE INVENTION

The tubular filter membranes or fibers are mounted in cylindrical housings, in the form of bundles contained in perforated sleeves with the ends of the bundles being potted in plates of resin. These housings are provided with lateral inlet or outlet orifices, and the free ends of the fibers lie flush with the plate in which they are potted to constitute the other outlet or inlet orifice, the assembly constituting a filter module. The housing of plastic material is constituted either as a one-piece molding or else it is built up from a plurality of molded sections, and it has the bundle and its sleeve mounted therein either by the potting plates being glued to the inside wall of the housing or else by potting the bundle and/or its sleeve directly inside the housing. In the past there have been no particular problems involved in installing the bundle in the housing since the bundles used have generally been of a diameter that does not exceed about 10 cm with the height of about 1 meter (m).

However, if it is desired to produce large quantities of filtered product by using large-sized bundles as obtained, for example, by interconnecting a plurality of elementary bundles at the potting plate, it becomes difficult to place the final bundle properly within the housing and keep it in place since the pressures exerted in operation can cause the connection between the potting plate and the housing to break in the long run.

SUMMARY OF THE INVENTION

The invention solves the problem by providing a housing for a filter module which includes both abutment and centering devices situated at short distances from respective ends of the housing. There is an abutment ring at the end of the housing which constitutes the bottom end of the module when mounted vertically, and at the opposite and there is a centering ring.

Advantageously, the abutment ring includes a first tapering section which also serves to center the bottom end of the bundle, and a second, horizontal section which serves as an abutment. Such a shape also facilitates unmolding the housing when the abutment ring is integrally molded therewith. The centering ring is preferably square or rectangular in section.

BRIEF DESCRIPTION OF THE DRAWINGS

An embodiment of the invention is described by way of example with reference to the accompanying drawing, in which.

DETAILED DESCRIPTION

Figure 1:
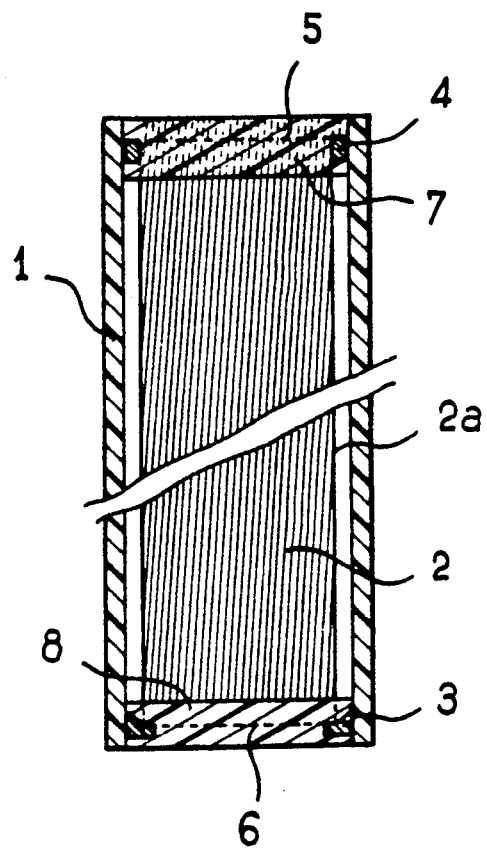
FIG. 1 is a section through a filter module including a housing of the invention.

A molded plastic housing 1 contains a bundle 2 of fibers which may optionally be subdivided into a plurality of elementary bundles. The sole bundle or each of the elementary bundles is contained in a sleeve 2a of perforated plastic material which does not prevent liquid passing therethrough. In order to simplify the drawing, FIG. 1 shows a single bundle together with a single sleeve.

At a short distance from one of its ends, namely the end which constitutes the bottom end of the sleeve when mounted vertically as shown in FIG. 1, an abutment ring 3 is provided against which the bottom edge 6 of the sleeve 2a bears when put into place. The abutment ring 3 preferably includes a first downwardly tapering surface on which the bottom edge 6 of the sleeve slides prior to bearing against a second, horizontal abutment surface.

Installation of the bottom portion of the sleeve is facilitated by using a tapering first section, however it would also be possible to make either with a horizontal ring serving solely as an abutment, or else with a stepped ring serving both for centering and abutment purposes, but making installation more difficult.

Figure 2:
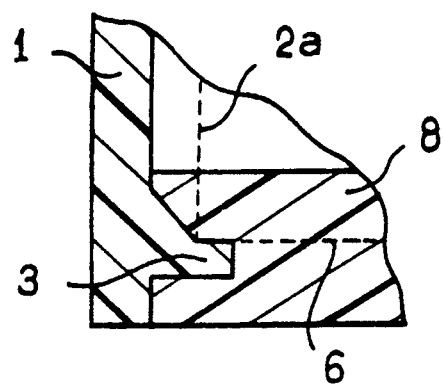
FIG. 2 shows an integrally molded abutment ring on a larger scale.

The abutment ring may be added on the housing (FIG. 1), or else it may be integrally molded therewith (FIG. 2).

At the top of the sleeve, a centering ring 4 is provided, being added on, e.g. by gluing. This ring may be made of the same plastic material as the housing or of any other material capable of being firmly fixed inside the housing and adhering reliably to the resin used for potting the ends of the fibers. The width of the ring corresponds to the gap between the housing and the bundle, and either both its height and its width may be equal (square section) or else they may be different (rectangular section). The ring is fixed at a level such that the top edge 5 of the sleeve and the top edge of the ring are substantially in alignment. Once the bundle 2 is in place in the housing, first one end is potted, and then the other, while making sure that the resin penetrates beyond the abutment ring and beyond the centering ring, thereby providing excellent fixing for the bundle inside the housing.

The presence of the abutment and the centering devices also provides the following advantage. It is known that the resins used for potting may adhere less well to the material of the sleeve than to the material of the filter fibers. In order to avoid any leakage or penetration at the surface of the potting resin, it is therefore necessary to pot beyond the end of the sleeve and thus to allow the fibers to project a little beyond the sleeve, thereby running the risk that a fiber may come level with the periphery of the plate thus setting up a leak between the plate and the housing. By ensuring constant spacing between the bundle and the housing, the ring ensures that this risk is completely eliminated.

Naturally the particular shapes described above and shown in the drawing for the abutment device and the centering device are not limiting and variants thereof may be envisaged.

I claim:

1. An axially-extending and circumferentially-closed hollow housing made of substantially rigid material for a hollow fiber filter module, a perforated sleeve of substantially rigid material containing hollow fibers received therein, said housing including both an abutment ring disposed in the interior of said housing with an inwardly projecting horizontal section close to that end of said housing which will be the bottom end after said module has been mounted vertically, and a centering ring adjacent the opposite end of said housing, the width of said centering ring corresponding to the gap between said housing and said sleeve, said sleeve being secured within said housing by potting said sleeve, the potting resin being disposed about said abutment ring and said centering ring and penetrating said sleeve.

2. A housing according to claim 1, wherein the abutment ring has a downwardly and inwardly tapering section followed by a further inwardly projecting horizontal section.

3. A housing according to claim 1, wherein the abutment ring is integrally molded with the housing.

4. A housing according to claim 1, wherein the centering ring is an add-on part.

5. A housing according to claim 4, wherein the centering ring is square or rectangular in section.

6. A housing according to claim 1 wherein said abutment ring is continuous.

7. A housing according to claim 1 wherein said housing defines an internal wall, and said abutment ring is secured to said internal wall of said housing for supporting the end of hollow fibers joined into one or more bundles.

* * * * *